US012601685B2

(12) United States Patent
Olivo et al.

(10) Patent No.: US 12,601,685 B2
(45) Date of Patent: Apr. 14, 2026

(54) RAPID DIAGNOSTICS FOR ANALYTE/BIOMARKER DETECTION BY RAMAN TECHNOLOGY WITH NON-SPECTROMETER RAMAN MEASUREMENT SYSTEM

(71) Applicant: Agency for Science, Technology and Research, Singapore (SG)

(72) Inventors: Malini Olivo, Singapore (SG); Jayakumar Perumal, Singapore (SG); Mohesh Moothanchery, Singapore (SG); Gurpreet Singh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 748 days.

(21) Appl. No.: 17/922,349

(22) PCT Filed: Apr. 30, 2021

(86) PCT No.: PCT/SG2021/050243
§ 371 (c)(1),
(2) Date: Oct. 28, 2022

(87) PCT Pub. No.: WO2021/221569
PCT Pub. Date: Nov. 4, 2021

(65) Prior Publication Data
US 2023/0175968 A1     Jun. 8, 2023

(30) Foreign Application Priority Data

Apr. 30, 2020     (SG) ............................ 10202004024X

(51) Int. Cl.
*G01N 21/64*          (2006.01)
*C07F 5/02*           (2006.01)
(Continued)

(52) U.S. Cl.
CPC ..... *G01N 21/65* (2013.01); *G01N 2021/0106* (2013.01); *G01N 2201/0221* (2013.01); *G01N 2201/06113* (2013.01)

(58) Field of Classification Search
CPC ........... G01N 21/65; G01N 2021/0106; G01N 2201/0221; G01N 2201/06113;
(Continued)

(56) References Cited

U.S. PATENT DOCUMENTS

2004/0152992 A1*   8/2004   Zeng .................... A61B 5/0075
                                                      600/476
2007/0285658 A1*   12/2007  Claps ....................... G01J 3/44
                                                      356/301
(Continued)

FOREIGN PATENT DOCUMENTS

CN        103776815 A   *   5/2014
CN        104777150 A       7/2015
(Continued)

OTHER PUBLICATIONS

Extended European Search Report (eESR) for European Patent Application No. 21 797 910.3 dated Apr. 29, 2024, pp. 1-9.
(Continued)

*Primary Examiner* — Jennifer Wecker
*Assistant Examiner* — Oyeleye Alexander Alabi
(74) *Attorney, Agent, or Firm* — Shackelford, Mckinley & Norton, LLP

(57)          ABSTRACT

A portable device which detects a Raman signal from an analyte of interest contained in or suspected to contain in a sample. The portable device includes a laser source in optical communication with a dichroic mirror, an objective lens optically positioned to consolidate the laser from the laser source to the sample, (i) a pair of rotatable filters in optical communication with the dichroic mirror and an
(Continued)

optical transmission module or (ii) a first band-pass filter in optical communication with the dichroic mirror and an optical transmission module, and a detector optically positioned to receive and detect a Raman signal produced from the laser incident on the analyte of interest. The dichroic mirror directs the laser from the laser source to the sample through the objective lens and transmits any Raman signal from the sample toward the detector. The detector is absent of a spectrometer and detects the Raman signal.

16 Claims, 8 Drawing Sheets

(51) Int. Cl.

| | |
|---|---|
| *C09B 57/00* | (2006.01) |
| *C09K 11/06* | (2006.01) |
| *G01N 15/10* | (2024.01) |
| *G01N 15/1429* | (2024.01) |
| *G01N 21/01* | (2006.01) |
| *G01N 21/65* | (2006.01) |
| *G01N 31/22* | (2006.01) |
| *G01N 33/483* | (2006.01) |
| *G01N 33/68* | (2006.01) |

(58) Field of Classification Search
CPC ............ G01N 21/658; G01J 2003/1213; G01J 2003/1221; G01J 3/0218; G01J 3/0227; G01J 3/0229; G01J 2003/4424; G01J 3/0272; G01J 3/12; G01J 3/2803; G01J 3/44
See application file for complete search history.

(56) References Cited

U.S. PATENT DOCUMENTS

| | | | | |
|---|---|---|---|---|
| 2011/0070661 A1* | 3/2011 | Porter | .................. | G01N 33/587 436/164 |
| 2012/0101374 A1* | 4/2012 | Tearney | ............... | A61B 5/6852 600/425 |
| 2012/0176600 A1* | 7/2012 | Falk | ....................... | G01N 21/65 356/51 |
| 2017/0307440 A1* | 10/2017 | Urban | ................ | G01N 21/6458 |
| 2018/0045651 A1* | 2/2018 | Jin | ......................... | G01N 21/87 |
| 2019/0369025 A1* | 12/2019 | Yang | ................... | A61B 5/4547 |

FOREIGN PATENT DOCUMENTS

| | | | | | |
|---|---|---|---|---|---|
| CN | 107462566 A | | 12/2017 | | |
| CN | 109283140 A | * | 1/2019 | .......... | G01N 21/658 |
| CN | 208588673 U | | 3/2019 | | |
| CN | 110501321 A | | 11/2019 | | |
| WO | 2018182537 A1 | | 10/2018 | | |
| WO | WO-2019231512 A1 | * | 12/2019 | ........... | G01J 3/0289 |
| WO | 2020000712 A1 | | 1/2020 | | |

OTHER PUBLICATIONS

International Search Report for International Application No. PCT/SG2021/050243 dated Jul. 5, 2021, pp. 1-3.
Written Opinion of the International Searching Authority for International Application No. PCT/SG2021/050243 dated Jul. 5, 2021, pp. 1-4.
Perumal et al., "SERS-Based Quantitative Detection of Ovarian Cancer Prognostic Factor Haptoglobin," International Journal of Nanomedicine, vol. 10, 2015, pp. 1831-1840.
De Luca et al., "Modulated Raman Spectroscopy for Enhanced Cancer Diagnosis at the Cellular Level," Sensors, vol. 15, 2015, pp. 13680-13704.
Liu et al., "A Tunable Single-Monochromator Raman System Based on the Supercontinuum Laser and Tunable Filters for Resonant Raman Profile Measurements," Review of Scientific Instruments, vol. 88, Article No. 083114, 2017, pp. 1-5.

* cited by examiner

RAPID DIAGNOSTICS FOR ANALYTE/BIOMARKER DETECTION BY RAMAN TECHNOLOGY WITH NON-SPECTROMETER RAMAN MEASUREMENT SYSTEM

CROSS-REFERENCE TO RELATED APPLICATION

This application claims the benefit of priority of Singapore Patent Application No. 10202004024X, filed 30 Apr. 2020, the content of it being hereby incorporated by reference in its entirety for all purposes.

TECHNICAL FIELD

The present disclosure relates to a portable device which detects a Raman signal from an analyte of interest contained in or suspected to contain in a sample. The portable device is absent of any spectrometer.

BACKGROUND

Surface-enhanced Raman spectroscopy (SERS) has been increasingly used for biosensing because of its high sensitivity and low detection limit, which are made possible by the unique Raman 'fingerprint' spectra from the biomolecules.

In a reported example, a SERS method for fast, sensitive, and reliable quantitative analysis of haptoglobin (Hp), an acute phase plasma glycoprotein that may be widely gaining application as a prognostic ovarian cancer biomarker, had been developed. However, the method used a commercially available Raman system that involved a spectrophotometer-based Raman reader to detect SERS signals from which the presence or absence of Hp was then identified. The method additionally involved the use of SERS nanoparticles to enhance SERS signals for detection.

In another example, modulated Raman spectroscopy as a rapid, inexpensive and accurate clinical tool to detect cancer cells, e.g. bladder cancer cells, was explored. In this example, an expensive laser source and a cooled charged-coupled device (CCD) spectrometer had to be employed for detecting Raman signals. Specifically, the setup was identical to a standard Raman microscope that relied on a spectrophotometer-based Raman reader operably connected to the CCD. The laser source was used to generate a laser beam that was expanded using a telescope to fill the back aperture of an objective lens, which then passed through a line filter and reflected from a notch filter into an inverted microscope. A magnifiying objective lens was used to focus the laser light on the sample and to collected backscattered photons. The scattered signal from the sample was then filtered by the same notch filter, transmitting only the Raman shifted light, and imaged into the spectrometer. Said differently, this method still used a spectrometer.

In another example, a laser source and a spectrometer were used for generating Raman profile measurements. The laser source involved a supercontinuum laser to generate an excitation source and the spectrometer was based on a commercial filter-based Raman system, wherein filters were utilized to reflect the laser beam into the microscope objective and to block the Rayleigh line and transmit the scattered Raman signal to the spectrometer for the measurement.

The examples described are just some of the many detection methods, which still relied on traditional spectrometer. Typically, a traditional spectrometer may operate through having a sample illuminated with, for example, a laser beam. The laser light may interact with molecular vibrations, phonons or other excitations in the system, resulting in the energy of the laser photons being shifted. The shift in energy gives information about the vibrational modes in the system. For example, electromagnetic radiation from the illuminated spot may be collected with a lens and sent through a filter to reduce any scattered radiation while the rest of the collected light is dispersed onto a detector in the Raman spectrometer. In other words, such methods do not afford its user portability as the methods require bulky spectrometer equipments and/or complex assaying steps that involve a variety of reagents, including SERS enhancing substrate. Where SERS enhancing substrate, e.g. nanoparticles are used, the SERS signals measured may considerably vary and several tests need to be carried out to obtain reproducible results.

In certain instances, without the use of SERS enhancing substrate, e.g. nanoparticles, analytes present in low concentration in a sample may not be detected or the measurements may not be confidently used. Even if a high-powered laser is used to work around issues with analytes in low concentrations, i.e. improve sensitivity, the high laser power may damage the sample even before a reading is obtained.

There is thus a need to provide for a solution that addresses one or more of the limitations mentioned above. The solution should at least provide for a portable Raman detection system operable to detect Raman signals from an analyte of interest in a sample that contains or suspected to contain the analyte of interest. The Raman detection system should not include a spectrometer for the Raman detection system to be portable.

SUMMARY

In a first aspect, there is provided a portable device which detects a Raman signal from an analyte of interest contained in or suspected to contain in a sample, the portable device includes:

a laser source in optical communication with a dichroic mirror;

an objective lens optically positioned to consolidate laser from the laser source to the sample;

(i) a pair of rotatable filters in optical communication with the dichroic mirror and an optical transmission module, or (ii) a first band-pass filter in optical communication with the dichroic mirror and an optical transmission module; and a detector optically positioned to receive and detect a Raman signal produced from the laser incident on the analyte of interest, wherein the dichroic mirror directs the laser from the laser source to the sample through the objective lens and transmits any Raman signal from the sample toward the detector, wherein the dichroic mirror is optically pervious to any Raman signal having a wavelength longer than the wavelength of the laser from the laser source, and wherein the detector is absent of a spectrometer and remains operable to detect the Raman signal.

In another aspect, there is provided for a portable device which detects a Raman signal from an analyte of interest contained in or suspected to contain in a sample, the portable device includes:

a laser source;

a first fiber in optical communication with the laser source and a dichroic mirror;

an objective lens optically positioned to consolidate laser from the laser source to the sample;

a pair of rotatable filters in optical communication with the dichroic mirror and a second fiber; and a detector optically positioned to receive and detect a Raman signal produced from the laser incident on the analyte of interest, wherein the first fiber includes a single mode fiber or a multi-mode fiber which directs laser from the laser source to the dichroic mirror, wherein the dichroic mirror directs the laser from the laser source to the sample through the objective lens and transmits any Raman signal from the sample toward the detector, wherein the dichroic mirror is optically pervious to any Raman signal having a wavelength longer than the wavelength of the laser from the laser source, and wherein the detector is absent of a spectrometer and remains operable to detect the Raman signal.

BRIEF DESCRIPTION OF THE DRAWINGS

The drawings are not necessarily to scale, emphasis instead generally being placed upon illustrating the principles of the present disclosure. Identical numeral reference used throughout the drawings and figures denotes for the same elements. In the following description, various embodiments of the present disclosure are described with reference to the following drawings, in which:

FIG. 1 shows a Raman spectra obtained using a Raman assay of the present disclosure, wherein the assay reactant (e.g. analyte, complex, peroxidase) is a flat line and the peroxidase product has a signature spectrum.

Figure 2A:
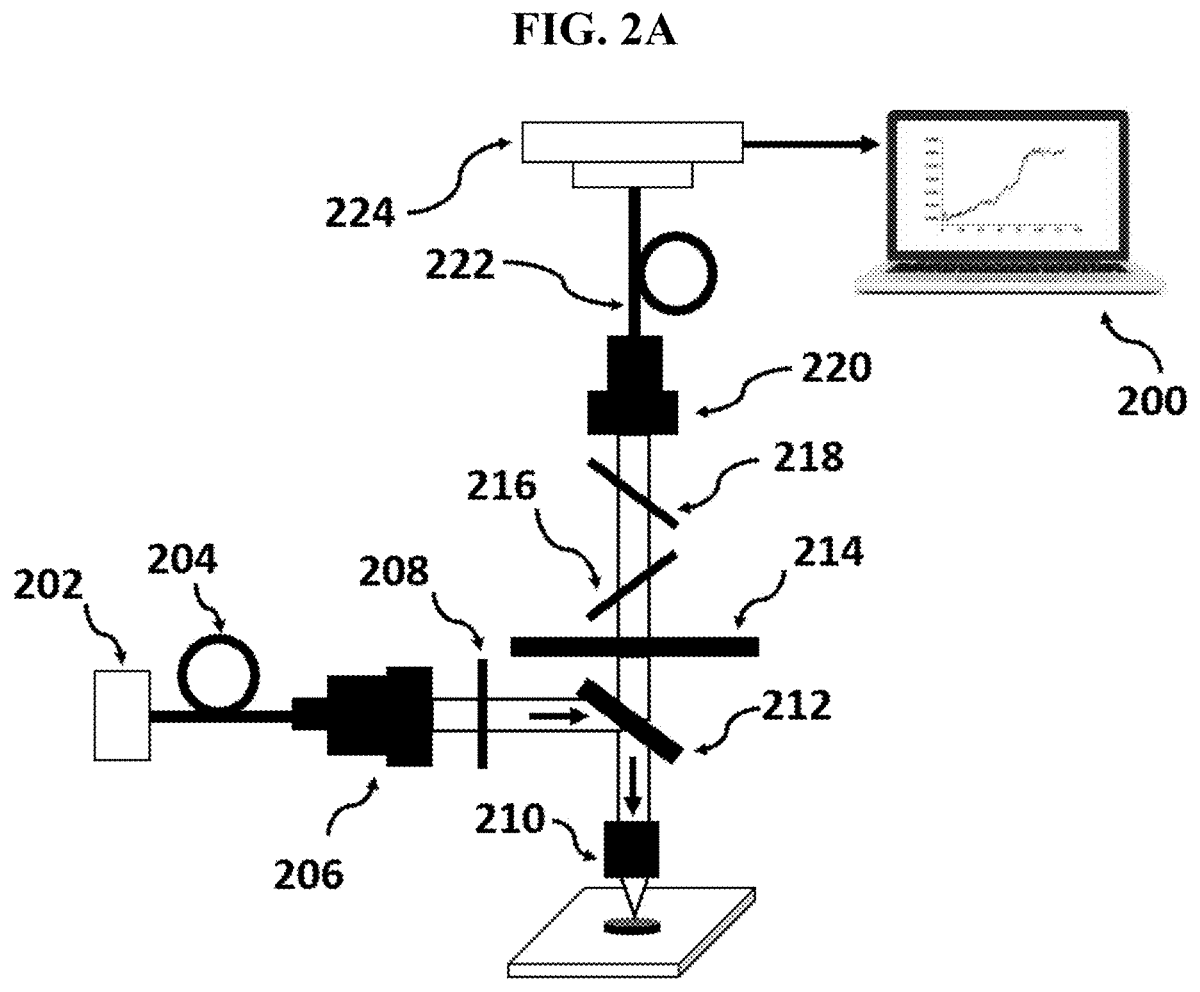

FIG. 2A shows a portable Raman device of the present disclosure. The present Raman device is non-spectrometer based. The present Raman device includes a laser source 202, a detector 224 (e.g. a CMOS sensor, a CMOS camera, a photomultiplier tube, or a photodiode), one or more tunable filters 216, 218, and a controlling computer 200. The controlling computer may be built-in or operably connected in any manner. The term "operably connected" herein means that the computer 200 can be connected to and removed from the portable device when needed. The present device can also include a collimating lens 206 which receives laser from the laser source 202 via a single mode or multi-mode fiber 204. A filter 208 (e.g. a band-pass filter) is used to clean any undesired signal (e.g. fluorescence signal) from the fiber 204. A dichroic mirror 212 reflects the laser into an objective lens 210 that then directs the laser to hit the sample on a microscope glass slide. The laser light incident on the sample may undergo a change (i.e. shift) in wavelength in the presence of an analyte of interest in the sample. This light (i.e. photons) having the shifted wavelength may be directed or reflected back toward the dichroic mirror 212 from the sample. The light or photons having the shifted wavelength may include or may constitute the Raman signal. The shifted wavelength may be longer than the wavelength of the laser from the laser source 202. That is to say, the Raman signal, which correspond to the analyte of interest, may have a wavelength longer than the wavelength of the laser from the laser source 202. Also, laser light from the laser source 202 incident on the sample may be reflected toward the dichroic mirror 212 from the sample. However, only photons or a Raman signal having a wavelength longer than the wavelength of laser from the laser source 202 are able to pass the dichroic mirror 212. The photons or Raman signal that passes through the dichroic mirror is subjected to another filter 214 (e.g. notch filter) prior to one or more tunable filters 216, 218, such that any laser from the laser source 202 reflected from sample (i.e. laser retaining its original wavelength) that happens to get through the dichroic mirror is prevented from reaching the detector 224. The Raman signal then goes through a collection collimator lens 220 and passes into a multi-mode fiber 222 to the detector 224.

DETAILED DESCRIPTION

Figures 2B, 3:
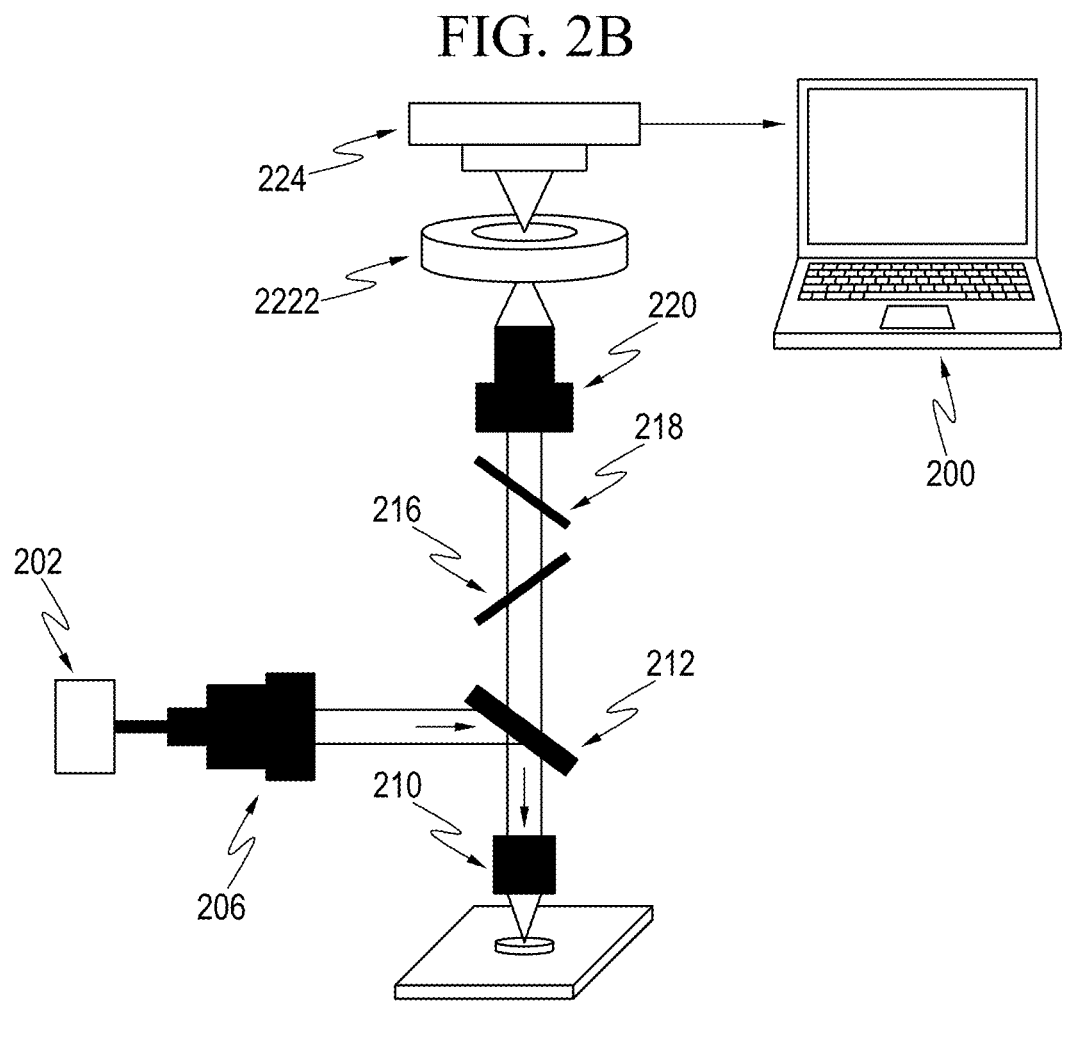
FIG. 2B shows a portable Raman device of the present disclosure. The present Raman device is non-spectrometer based. The present Raman device includes a laser source 202, a detector 224 (e.g. a CMOS sensor, a CMOS camera, a photomultiplier tube, or a photodiode), one or more tunable filters 216, 218, and a controlling computer 200. The portable Raman device of FIG. 2B is identical to the portable Raman device of FIG. 2A except that the single or multi-mode fiber 204, filter 208, filter 214 and multi-mode fiber 222 are absent. In place of these, as shown in FIG. 2B, the laser source 202 is in optical communication directly with the collimating lens 206 (e.g. no fibers are used and there is an empty space in which laser light from the laser source is transmitted toward the collimating lens 206, or an ordinary optic fiber is used). Also, multi-mode fiber 222 is replaced with a pinhole occluder 2222. The pinhole occluder 2222 can be herein described as an optical transmission module as the pinhole occluder 2222 helps transmit and focus the Raman signal toward the detector 224.
FIG. 3 shows an example of a portable Raman device of the present disclosure having a small foot print suitable for use. As the present Raman device does not require a bulky spectrometer to operate or to be connected to for operation, the present Raman device is readily portable. Said differently, there is no need to disconnect from a spectrometer for the present Raman device to be portable, as it already does not involve a spectrometer. The present Raman device being free of a spectrometer can be portably placed at a bedside, in an operation theatre of a hospital, and for outdoor usage, without being permanently setup in a lab.
Figure 4A:
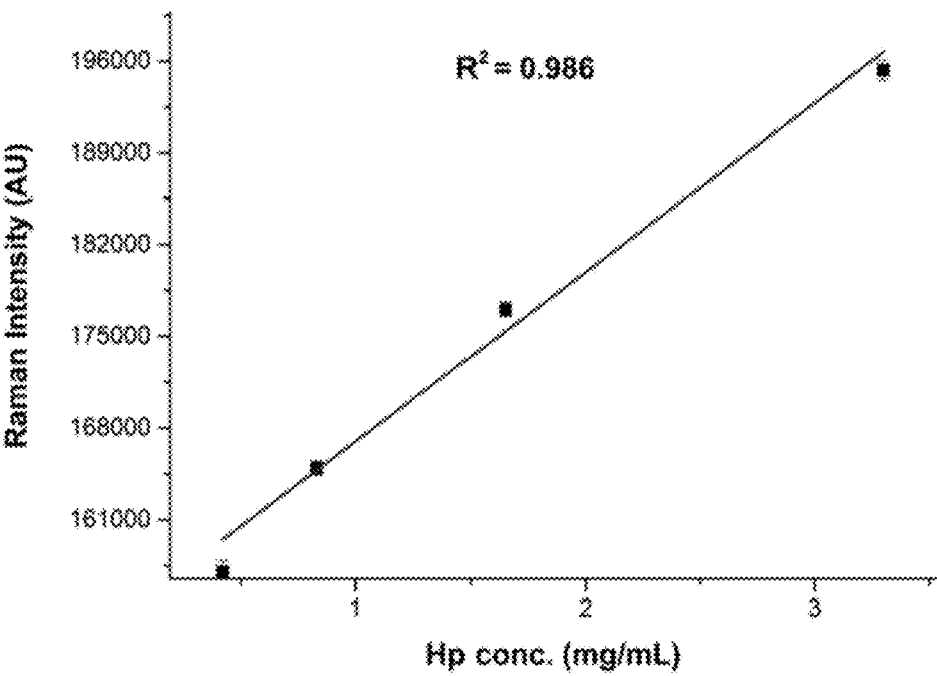
FIG. 4A shows a calibration plot of a Raman assay of the present disclosure using the present Raman device.
Figure 4B:
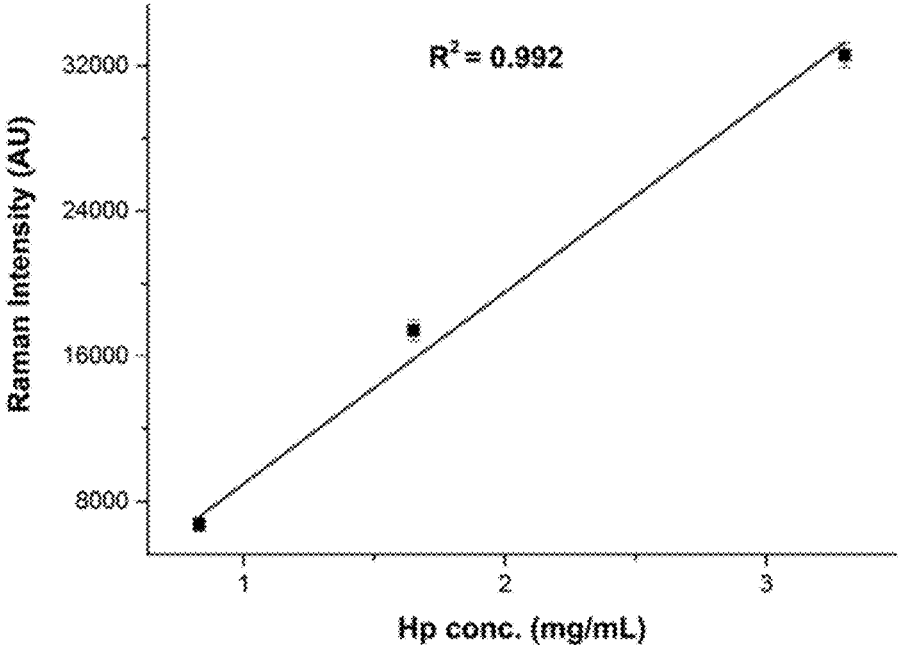
FIG. 4B shows a calibration plot of a Raman assay of the present disclosure using the present Raman device.
Figure 4C:
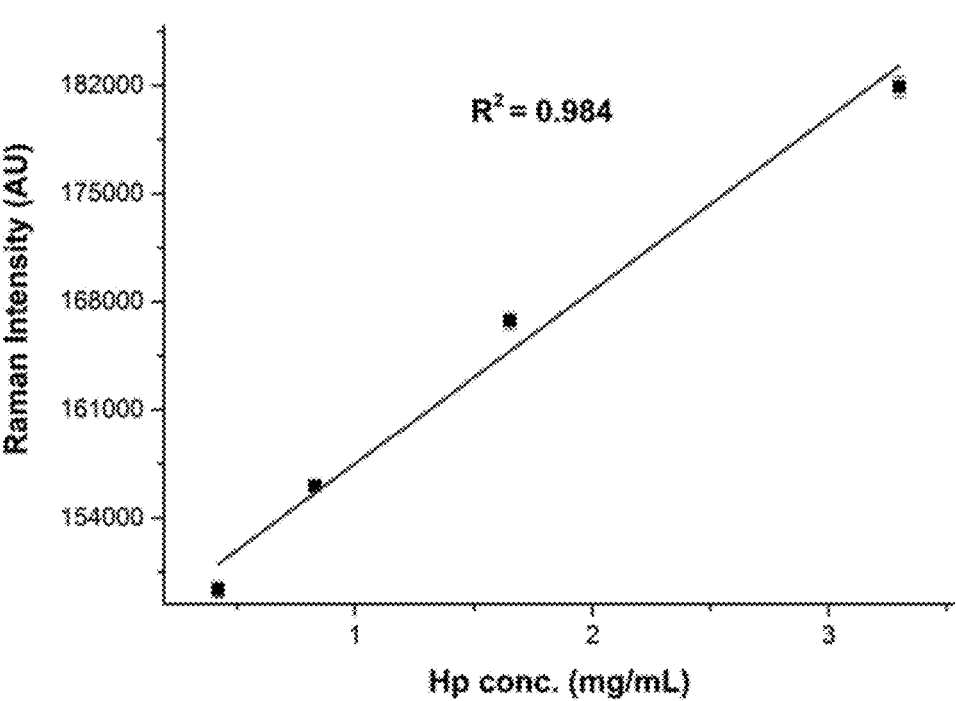
FIG. 4C shows a calibration plot of a Raman assay of the present disclosure using the present Raman device.

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a Raman device that can identify an analyte of interest in a sample containing or suspect to contain the analyte of interest via a Raman signal emitted by the analyte of interest. The present Raman device is termed herein a "Raman reader", as it is a device that can detect and identify a Raman signal. The present Raman device may be termed herein a "portable device" for brevity.

A Raman signal is a structural fingerprint by which a molecule (i.e. analyte) can be identified. To generate a Raman signal, inelastic scattering of photons is relied upon. In the present disclosure a laser source provides a laser, which interacts with the molecular vibrations, phonons or other excitations present, resulting in the energy of the laser photons being shifted. That is to say, the laser from the laser source interacts with a sample containing or suspected to contain an analyte of interest, wherein the laser may undergo a change in its wavelength to form photons having shifted wavelengths that include or constitute the Raman signal. The shift in energy or wavelength provides information about the vibrational modes of the analyte of interest. The vibrational modes depend on the chemical structure (i.e. structural fingerprint) of the molecule (i.e. analyte). Light (e.g. photons) carrying the shifted energy is collected and directed to a detector. Such photons carrying the shifted energy may be referred to as the Raman signal, wherein the Raman signal corresponds to the analyte of interest.

Advantageously, the present Raman device does not require a spectrometer as the detector to detect and identify a Raman signal. A spectrometer is a bulky equipment and does not confer portability. A spectrometer is also expensive. Spectrometer is traditionally used in Raman spectroscopy for detecting Raman signals. As the present Raman device can circumvent use of a spectrometer, the present Raman device advantageously reduces cost, and has a smaller size that renders the device portable without compromising capability to acquire Raman signals.

The terms "analyte", "biomarker", "target molecule" and "target" as interchangeably used herein, refer to any substance that can be detected via the present device using Raman detection. The analyte of interest may be Raman active (i.e. Raman enabled) or Raman inactive. That is to say, in the case of an analyte that is a Raman active analyte, the analyte can generate a Raman signal.

In case of an analyte that is not Raman active, a Raman assay to render the analyte Raman active can be adopted. Advantageously, the present Raman device is compatible with various Raman assay methods, including the Raman assay method of the present disclosure. The Raman assay method of the present disclosure involves binding the analyte of interest with an analyte-binding molecule to form a complex having peroxidase activity. The complex can then react with a peroxidase substrate in the presence of a peroxidase source to generate a Raman active peroxidase product. A raman signal can then be generated from the peroxidase product to in turn identify if the analyte of interest is present in a sample. The details of the present Raman assay method are described in the examples herein further below.

As mentioned above, the analyte may be attached to an analyte-binding molecule, and which, in certain embodiments, may be present in the sample. Therefore, the analyte can be, without limitation, any substance of interest that can be identified through a Raman signal. The analyte may, for example, be an antigen, a protein, a polypeptide, a nucleic acid, a hapten, a carbohydrate, a lipid, a cell or any other of a wide variety of chemical, biological or non-biological molecules, complexes or combinations thereof. Further non-limiting examples of an analyte of interest are described in the examples of the present disclosure.

In case Raman signals from the analyte of interest are weak, SERS can be employed. In other words, the present Raman device is not only compatible with a Raman assay, it is also compatible with SERS technique. SERS is an abbreviation of surface-enhanced Raman scattering, which is a surface-sensitive technique that enhances Raman scattering by molecules adsorbed on rough metal surfaces or by plasmonic nanostructures such as plasmonic-magnetic silica nanotubes or gold nanoparticles. For example, a sample may be mixed with a SERS substrate to render SERS signals instead of just Raman signals. As a further example, the Raman assay of the present disclosure as mentioned above can be employed with SERS. Accordingly, the present Raman device is versatile in that it can be operable for both Raman and SERS measurements.

Advantageously, even without SERS, the present Raman device is sufficient to detect Raman signals, which may be considerably weaker than SERS signals, with high accuracy and reproducibility.

The present Raman device involves, for example, one or more tunable (rotatable) filters that can help detect directly the weaker Raman signals. The term "tunable filter" herein refers to a "rotatable filter", i.e. a filter rotatable about an axis. This is described in more details herein further below and in the examples section of the present disclosure. The one or more rotatable filters may be a pair of rotatable filters.

The present Raman device can be configured to specifically identify for a single peak measurement in one or more wavenumber regions. For instance, a short window (wavenumber region) between 1550 to 1650 cm$^{-1}$ can be used to monitor the Raman signature (i.e. Raman signal) from the analyte of interest.

Details of various aspects and embodiments of the present Raman device and advantages associated with the various aspects and embodiments are further described below and in the examples demonstrated herein.

In the present disclosure, there is provided for a portable device which detects a Raman signal from an analyte of interest contained in or suspected to contain in a sample.

In a first aspect, the portable device can include a laser source in optical communication with a dichroic mirror. The portable device can include an objective lens optically positioned to consolidate the laser from the laser source to the sample and/or photons reflected from the sample back to the dichroic mirror. The portable device can include a pair of rotatable filters in optical communication with the dichroic mirror and an optical transmission module, or (ii) a first band-pass filter in optical communication with the dichroic mirror and an optical transmission module. Also, the portable device can include a detector optically positioned to (i) receive and detect photons or a Raman signal produced from the laser incident on the analyte of interest or (ii) to receive photons from the optical transmission module to detect a Raman signal produced from the laser incident on the analyte of interest. Details of the various components, such as the laser source, dichroic mirror, objective lens, the pair of rotatable filters, the first-band-pass filter, the optical transmission module, etc. are described further below. In the first aspect, the dichroic mirror may direct the laser from the laser source to the sample through the objective lens and transmits any photons or Raman signal from the sample toward the detector. The dichroic mirror may be optically pervious to any photons or Raman signal having a wavelength longer than the wavelength of the laser from the laser and/or the dichroic mirror may be optically non-pervious to laser reflected from the sample having a wavelength shorter than wavelength of the laser from the laser source. In the first aspect, the detector is absent of a spectrometer and remains operable to detect the Raman signal In various aspects, the present portable device can include a laser source. The laser source can be a monochromatic laser source. The term "monochromatic" herein means the laser provided by the laser source is of a single wavelength of frequency. In various aspects, the laser from the laser source may have a wavelength ranging from 400 nm to 800 nm, 457 nm to 785 nm, 473 nm to 785 nm, 488 nm to 785 nm, 514 nm to 785 nm, 532 nm to 785 nm, 633 nm to 785 nm, 660 nm to 785 nm, etc. In various aspects, the laser from the laser source may have a wavelength of 785 nm, 660 nm, 633 nm, 532 nm, 514 nm, 488 nm, 473 nm, 457 nm, or 400 nm. A laser source providing a laser having a wavelength in such range confers better detection efficiency.

The laser source can be in optical communication with a dichroic mirror. The term "optical communication" used herein means that the optical transmission can take place between two or more components of the present portable device. Said differently, light can be transmitted directly or indirectly between two or more components. For instance, light (e.g. a laser) can be generated from the laser source and propagate in a direction toward the dichroic mirror. The laser from the laser source can be transmitted to the dichroic mirror with or without any optical fibers and/or lens, i.e. light can be transmitted even through an empty space between two or more components of the present portable device. Where light is transmitted directly between two or more components, there are no intervening components between the two or more components through which the light may transmit. Where light is transmitted indirectly between two or more components, there may be intervening components present through which the light may transmit.

The present portable device may optionally further include a first fiber. The first fiber can be in optical communication with the laser source and a dichroic mirror. The the first fiber provides for optical transmission between two or more components of the present portable device for signal delivery and detection, wherein the optical transmission is guided. That is to say, the region in which light (e.g. the laser) may propagate is confined within the structure of the first fiber and the light is delivered from one component toward another. For instance, light (e.g. a laser) can be generated from the laser source and travels through within the fiber to reach the dichroic mirror. The first fiber helps to direct light (e.g. a laser) toward the dichroic mirror from the laser source. In other words, the first fiber can act as a waveguide to transmit light (e.g. laser) from the laser source.

The present portable device can include an objective lens optically positioned to consolidate laser from the laser source to the sample. The objective lens may be optically positioned to consolidate photons reflected from the sample back to the dichroic mirror. The term "objective lens" herein refers to one or more lenses that may be made of glass or an optically pervious material which collects (i.e. consolidates or focuses) light onto and/or from a sample. In other words, the objective lens of the present device is positioned proximal to the sample containing or suspected to contain the analyte of interest. In various aspects, the objective lens channels light (e.g. laser) incident on the dichroic mirror onto the sample and any reflected light (e.g. laser) from the sample back to dichroic mirror. In various aspects, a normal focusing lens (e.g. an achromatic lens such as an achromatic doublet) may be used instead of an objective lens.

In various aspects, the present portable device can include a detector optically positioned to receive and detect a Raman signal or photons produced from the laser incident on the analyte of interest. The detector may be optically positioned to receive and detect a Raman signal or photons from the optical transmission module to identify a Raman signal produced from the laser incident on the analyte of interest. In the present portable device, the detector does not include and is absent of a spectrometer, yet the detector and the portable device remain operable to detect the Raman signal.

In various aspects, the detector can include or consist of a CMOS sensor, a photodiode, or a photomultiplier tube. The detector can include or consist of a CMOS camera. In other words, the CMOS sensor is CMOS camera in certain instances. The term "CMOS" is an abbreviation of the "complementary metal oxide semiconductor". In a CMOS sensor, the charge from a photosensitive pixel is converted to a voltage at the pixel site and the signal is multiplexed by row and column to multiple on chip digital-to-analog converters (DACs). As such, a CMOS sensor is a digital device. Each site may include a photodiode and three transistors, performing the functions of resetting or activating the pixel, amplification and charge conversion, and selection or multiplexing to render an image from the light captured. In various aspects, the detector may be a charged-coupled device sensor (CCD) or a CMOS sensor. Both the CCD and CMOS sensor have the ability to control integration time to enhance the Raman signals detected. Where a photodiode is used, multiple signals may have to be collected and an average of the multiple signal collected may have to be derived (i.e. signal averaging), as the photodiode does not have the option to control the integration time. Conversely, in traditional spectrometer, expensive line scan CCD or CMOS cameras are used, such line scan CCD or CMOS cameras are expensive and require cooling mechanisms to be operable. The portable device of the present disclosure can be absent of such line scan CCD and CMOS cameras.

In various aspects, the first fiber can include a single mode fiber or a multi-mode fiber. The term "single mode fiber" herein refers to a fiber that enables one type of light mode to be propagated at a time. The term "multi-mode fiber" herein refers to a fiber that propagate multiple modes. The first fiber, and the second fiber later described herein in more detail, can include or can be an optical fiber. The first fiber, and the second fiber, carries light in what are called "mode". The term "mode" and grammatical variant "modes" herein refers to the different ways light travels in a conduit, such as a fiber. In other words, the terms "mode" and "modes" refer to the path and paths, respectively, that a light travels through a fiber. For example, one mode is that the light travels in a linear path through the fiber. Another mode is that the light bounces between the walls of a fiber. To simply put it, "single mode" means that the light travels through the fiber in one path and "multi-mode" means there are several rays of light traveling through fiber in different paths, at least one path of travel is different from the others, e.g. one light ray travels linearly but the others all bounces against wall of the fiber. Advantageously, the present device is versatile in that a single mode or multi-mode fiber can be used to have the laser source and the dichroic mirror in optical communication. In various aspects, the first fiber directs laser from the laser source to the dichroic mirror.

In various aspects, the dichroic mirror directs the laser from the laser source to the sample through the objective lens and transmits any Raman signal or photons from the sample toward the detector. The term "dichroic mirror" herein refers to a reflector that selectively reflects light of a certain range of wavelength while allowing light of other wavelengths to pass through. For example, in the present portable device, the dichroic mirror can be optically pervious to photons or a Raman signal from the sample having a wavelength longer than the wavelength of the laser from the laser source, and/or the dichroic mirror may be optically non-pervious to laser reflected from the sample having a wavelength shorter than wavelength of the laser from the laser source. The term "optically non-pervious" herein refers to a material that at least does not allow light or a range of wavelength of light to pass through the material. The term "optically pervious" herein refers to a material that allows some or all light to pass through the material. The optically non-pervious material may reflect the light away therefrom. Said differently, the dichroic mirror may only allow photons reflected from the sample having a wavelength longer than the wavelength of laser from the laser source to pass through. The photons may constitute the Raman signal that corresponds to the analyte of interest in the sample. In various aspects, the dichroic mirror may reflect certain wavelengths of light and transmit certain wavelengths of light, i.e. so the dichroic mirror not only reflects light but also transmits light. As such, the dichroic mirror may be a reflective transmittive filter. In various aspects, the dichroic mirror may be configurable depending on the wavelength of the laser provided by the laser source. For example, if the laser source provides a laser of 785 nm, the dichroic mirror may reflect laser of 785 nm and transmit any photons or Raman signal reflected from the sample or produced from laser incident on the sample having a wavelength of 800 nm and above. Raman signals may then be identified from such laser of 800 nm and above. In another example, if the laser source provides a laser of 633 nm, the dichroic mirror may reflect laser of 633 nm and transmit any photons or Raman signal reflected from the sample or produced from laser incident on the sample having a wavelength of 635 nm and above.

In various aspects, the dichroic mirror relies on a principle of thin-film interference. That is, when light strikes at an angle, some of the light may be reflected and some may be transmitted through. This may be achieved by adding one or more layers of material of varying indexes of refraction to exploit the interference nature of light waves. Considering that light traveling from a lower index material may reflect off a higher index material, only light of a certain angle and wavelength may constructively interfere with the incoming beam and pass through the dichroic mirror, while all other light may be destructively interfered and reflected off the dichroic mirror. In various aspects, the dichroic mirror may be optically positioned to have the laser from the laser source incident on the dichroic mirror to define an angle of incidence of 45°, as a non-limiting example.

In various aspects, the present portable device can optionally include a first collimating lens in optical communication with the first fiber and the dichroic mirror. In various aspects, the first collimating lens may be optically positioned between the laser source and the dichroic mirror. The term "collimating" herein refers to a lens that aligns or accurately aligns light or photons in a parallel manner. For light transmission and measurement, this ensures that the laser beams from the laser source are sufficiently spread as it propagates such that the laser beams hit the entire surface area of the objective lens or a substantial portion thereof facing the laser source. This in turn renders better focus from the objective lens. In various aspects, the first collimating lens may include or may be a pair of collimating lens.

In various aspects, the present portable device can further include a second band-pass filter that can be optically positioned after the first fiber and before the dichroic mirror. The term "optically positioned" herein means that a component is configured or arranged such that light or laser can be transmitted and/or received in a certain manner, e.g. between two or more components.

In various aspects, the second band-pass filter advantageously eliminates fluorescence generated from laser transmitting through the first fiber.

In various aspects, the present portable device can optionally include a notch filter that can be optically positioned between (i) the dichroic mirror and the pair of rotatable filters or (ii) the dichroic mirror and the first band-pass filter. In various aspects, the notch filter advantageously eliminates laser from the laser source from reaching the detector through the pair of rotatable filters or the first band-pass filter. In various aspects, the first band-pass filter may be used in place of the pair of rotatable filters where detection is specifically for a single Raman peak. As such, one band-pass filter optically pervious to a specific wavelength (i.e. only allow light of a single wavelength to transmit through) may be used instead of one or more (e.g. a pair) of tunable filters.

Figures 8, 9:
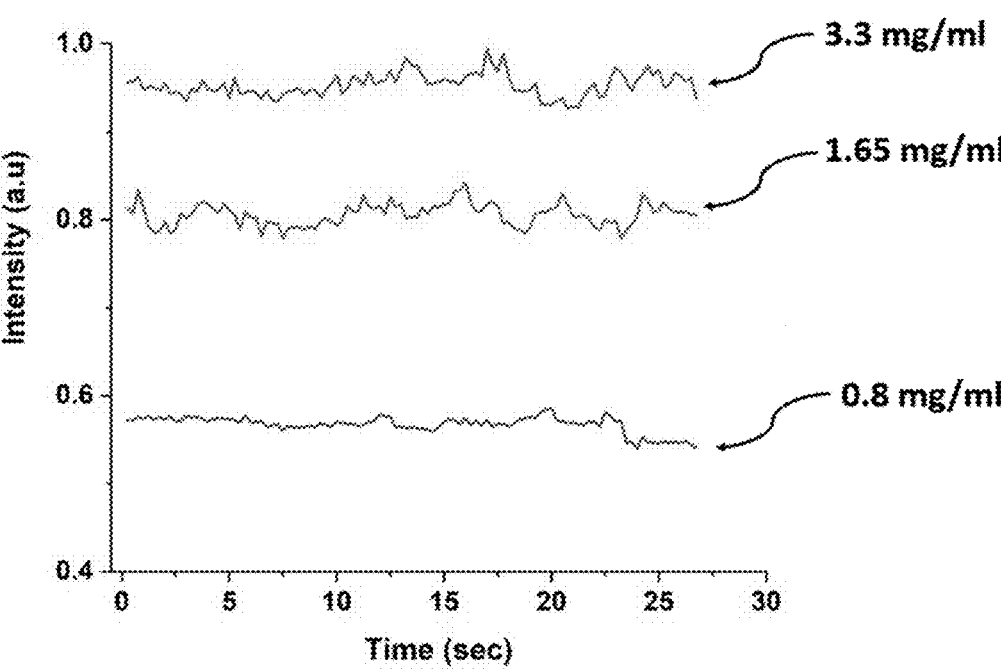
FIG. 8 shows the Raman signals from haptoglobin sample identified using the present Raman device of FIG. 2A.
FIG. 9 shows the Raman shift in the glass spectrum with tunable filtering. In this instance, the Raman signals are detected from the glass slide at different wavenumbers. In other words, the peaks in FIG. 9 do not depict the concentration of detected analytes. Rather, FIG. 9 demonstrates that the tunable filters are operable at any wavenumber selected, by changing the angle of each tunable filters which photons or Raman signal (reflected from a sample) is incident on. This illustrates the capability of the present portable device to operably provide for a single peak location and that the present portable device is operable at any wavenumber region.
Figure 10:
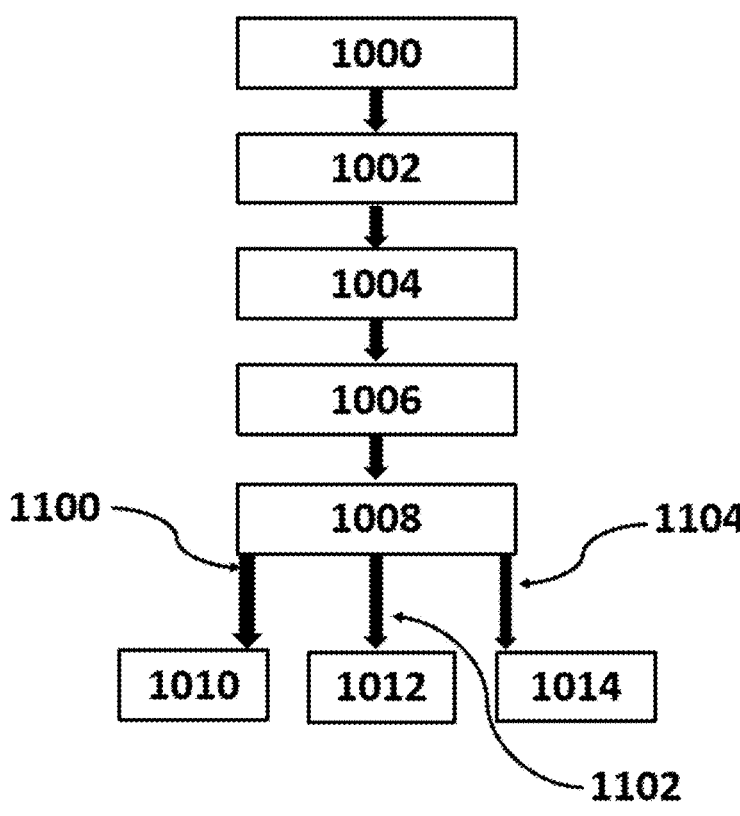
FIG. 10 shows the methodology (i.e. workflow) of the software in the computer 200 of the present Raman device. 1000 denotes for selecting a region of interest (ROI) from the sensor image collected and selected. 1002 denotes that the mean (i.e. average) intensity value is filtered and/or smoothened by the software. 1004 denotes that the smoothened mean intensity value is divided to know the cut-off 1006 denotes waiting for a few seconds to stabilize the final signal value. If the final signal value 1100 is less than a designated arbitrary value (e.g. less than 0.9 or less than 0.8), a negative result 1010 is indicated by the software, meaning the sample is absent of the analyte of interest. If the final signal value 1102 ranges from a designated arbitrary value or range (e.g. 0.8 to 1.1, 0.8 to 1.2, 0.9 to 1.1 or 0.9 to 1.2), the software indicates for further evaluation 1012 (e.g. repeating the experiment using the present device and/or include use of other detection methods to substantiate whether the analyte of interest is absent or present). If final signal value 1104 is more than a designated arbitrary value (e.g. 1.1 or 1.2), the software indicates a positive result 1014, meaning the sample contains the analyte of interest.

In various aspects, each rotatable filter in the pair of rotatable filters can be rotatable to have an angle defined by the photons or Raman signal reflected from the sample incident on the one or more rotatable filters and a surface of each of the one or more filters which the photons or Raman signal reflected from the sample is incident on. Such an angle can render the one or more rotatable filters optically pervious (allows light, e.g. photons or Raman signal, to pass through) to some wavelengths but not all wavelengths of the photons transmitted from the dichroic mirror to define a Raman signal identifiable by the detector corresponding to the analyte of interest from the photons having wavelengths that pass through the one or more rotatable filters. In various aspects, each rotatable filter in the pair of rotatable filters can be rotatable to have an angle defined by the photons or Raman signal reflected from the sample incident on each of the rotatable filters and a surface of each of the rotatable filters which the photons or Raman signal reflected from the sample is incident on, wherein the angle renders each rotatable filter optically pervious to a range of wavelengths of the photons transmitted from the dichroic mirror to define a Raman signal identifiable by the detector. FIG. 9 demonstrates an example of the detection from the pair of rotatable filters in the wavenumber region of 1250 to 1800 $cm^{-1}$. This may correspond to a pair of rotatable filters optically pervious to photons or Raman signal of 870 nm to 915 nm reflected from the sample, wherein the laser from the laser source has a wavelength of 785 nm. This may also correspond to a pair of rotatable filters optically pervious to photons or Raman signal of 688 nm to 715 nm reflected from the sample, wherein the laser from the laser source has a wavelength of 633 nm. In various aspects, each rotatable filter in the pair of rotatable filters can be rotatable to have an angle defined by the photons or Raman signal reflected from the sample incident on each of the rotatable filters and a surface of each of the rotatable filters which the photons or Raman signal reflected from the sample is incident on, wherein the angle can render each rotatable filter optically pervious to a range of wavelengths of the photons or Raman signal transmitted from the dichroic mirror to be detected by the detector so as to have the detector identify the Raman signal corresponding to the analyte of interest from the range of wavelengths of photons.

In various aspects, the portable device may include one or more rotatable filters, wherein the one or more rotatable filters can include two (i.e. a pair) rotatable filters. In various aspects, each of the one or more rotatable filters may be operably attached to one or more rotational members. The rotational member can control the rate, the angle, and/or direction of rotation of the one or more rotatable filters. For example, the one or more rotatable filters may be operably attached to one rotational member. As another example, the one or more rotatable filters may be operably attached to more than one rotational member. Each rotatable filter may be attached to one or more rotational members. In certain instances, the pair of rotatable filters and the one or more rotational members may be operably attached such that the pair of rotatable filters cooperate in a manner to render the one or more rotatable filters optically pervious to (i) some wavelengths but not all wavelengths, or (ii) to a range of wavelengths, of the photons signal transmitted from the dichroic mirror to (i) define a Raman signal identifiable by the detector or (ii) be detected by the detector so as to have the detector identify the Raman signal corresponding to the analyte of interest from the range of wavelengths of photons.

The present portable device can include a second collimating lens that can be in optical communication with (i) the optical transmission module and the one or more (e.g. pair of) rotatable filters or (ii) the optical transmission module and the first band-pass filter. In various aspects, the optical transmission module may be optically positioned after the second collimating lens but before the detector.

In various aspects, the optical transmission module may include or may be a second fiber or a pinhole occluder to direct any photons or Raman signal to the detector from the pair of rotatable filters or from the first band-pass filter. In various aspects, the second fiber may include or may be a multi-mode fiber. The second fiber acts as a waveguide to transmit photons or Raman signal reflected from the sample to the detector.

In various aspects, the present portable device can further include an operating module operably connected to the detector and/or (i) the pair of rotatable filters or (ii) the first band-pass filter, to generate a Raman spectrum which indicates the presence or absence of the analyte of interest. The operating module can include a user interface that allows generation of a Raman spectrum from the Raman signal identified by the detector. The operating module can control the operations of the various components described above. The operating module can be a computer.

The present Raman assay and device can be operable ex vivo and in vitro. The present Raman assay and device can be carried out in the absence of a human or animal body. It is to be noted that configuration of the various elements and/or components described above are illustrated in FIG. 2A and FIG. 2B of the accompanying drawings by way of non-limiting example.

In another aspect, the present portable device can include a laser source. The present portable device include a first fiber in optical communication with the laser source and a dichroic mirror. The present portable device can include an objective lens optically positioned to consolidate (i) laser from the laser source to the sample and/or (ii) photons or Raman signal reflected from the sample back to the dichroic mirror. The present portable device can include a pair of rotatable filters in optical communication with the dichroic mirror and a second fiber. Also, the present portable device can include a detector optically positioned (i) to receive photons or Raman signal from the second fiber to detect a Raman signal produced from the analyte of interest or (ii) to receive and detect a Raman signal produced from the laser incident on the analyte of interest. The first fiber can include or can be a single mode fiber or a multi-mode fiber which directs laser from the laser source to the dichroic mirror. The dichroic mirror may direct the laser from the laser source to the sample through the objective lens and transmits the photons or Raman signal reflected from the sample. The dichroic mirror may be optically pervious to any photons or Raman signal having a wavelength longer than the wavelength of the laser from the laser source. The dichroic mirror may be optically non-pervious to laser reflected from the sample having a wavelength shorter than wavelength of the laser from the laser source. The detector is absent of a spectrometer and remains operable to detect the Raman signal. Embodiments and advantages described for the portable device of the earlier first aspect can be analogously valid for the portable device of the subsequent aspect described herein, and vice versa. As the various embodiments and advantages have already been described above and in the examples demonstrated herein, they shall not be iterated for brevity. For instance, details of the various components, such as the laser source, dichroic mirror, objective lens, the first fiber, the pair of rotatable filters, the first-band-pass filter, the optical transmission module, the second fiber, etc. are already described earlier above.

In various aspects, the first fiber and the first collimating lens may be optional. In various aspects, the laser from the laser source may be delivered to the dichroic mirror without using the first fiber. If no fiber is used for delivering light from the laser source to the dichroic mirror, the second band-pass filter may not be needed, as there are no fluorescence from the first fiber to eliminate. The pair of rotatable filters advantageously detects for different Raman peaks of interest.

The word "substantially" does not exclude "completely" e.g. a composition which is "substantially free" from Y may be completely free from Y. Where necessary, the word "substantially" may be omitted from the definition of the present disclosure.

In the context of various aspects, the articles "a", "an" and "the" as used with regard to a feature or element include a reference to one or more of the features or elements.

In the context of various aspects, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to a portable Raman device for detecting Raman signals that identifies the presence or absence of an analyte of interest contain or suspected to contain in a sample.

The present Raman device is absent of (i.e. does not include) any spectrometer as the detector and is hence readily portable. Without the need to acquire Raman signals using a spectrometer, the present Raman device is more economically viable, and can be of a smaller footprint, i.e. smaller in size that renders the present Raman device conveniently portable.

The present Raman device is an optical device that includes use of at least one tunable filter for Raman detection of the analyte of interest. The at least one tunable filter can be operably connected to a rotational member (i.e. a rotational stage) that controls the rate, angle, and direction at which the tunable filters rotate to define the angle at which photons or a Raman signal falls incident on the at least one tunable filter, such that a complete Raman spectrum can be plotted using the present Raman device. As mentioned above, the term "tunable filter" herein means that the filter is rotatable about an axis. The at least one tunable filter may be a pair of tunable filters.

Using the pair of rotatable filters as an example, the wavenumber region of choice in which a Raman peak is to be detected or identified may be selected. For different applications, the wavenumber region may be different and hence such rotatable filters easily allows tuning for the wavenumber region in which a Raman peak of interest is to be identified. This is demonstrated in FIG. 9 by way of a non-limiting example, wherein FIG. 9 depicts any wavenumber region from 1300 to 1800 $cm^{-1}$ can be selected. Again, this was achieved by changing the angle of incidence of the laser reflected from the sample on each rotatable filter. Given that the region of interest was between 1550 to 1650 $cm^{-1}$, such a wavenumber region was demonstrated for. In cases where there is a need to detect multiple wavenumber regions, the rotatable filters can be attached to one or more rotational members (i.e. rotational stage) to change the angles of incidence and hence multiple peaks can be detected using the present portable device.

The pair of rotatable filters may be a pair of edge tunable filters as a non-limiting example. The pair of edge tunable filters may include a long-pass filter and a short-pass filter. With this pair of rotatable filters, the angle of incidence of photons or Raman signal reflected from the sample on each rotatable filter may be varied for detecting any Raman peak of choice. Alternatively, a band-pass filter may be used in place of the at least one (e.g. a pair) rotatable filter. The band-pass filter may be optically pervious to photons or Raman signal having a wavelength of 900±10 nm, wherein the laser from the laser source has a wavelength of 785 nm. In another example, the band-pass filter may be optically pervious to photons or Raman signal having a wavelength of 705±10 nm, wherein the laser from the laser source has a wavelength of 633 nm.

In the present Raman device, a CMOS camera can be used to identify a Raman signal generated from the analyte of interest.

The present Raman device can operate with a Raman assay of the present disclosure. The present Raman device, including the present Raman assay, are described in further details, by way of non-limiting examples, as set forth below.

Example 1: Raman Assay of the Present Disclosure

The presence or absence of an analyte of interest in a sample containing or suspected to contain the analyte may be identified using a Raman assay disclosed herein. The Raman assay can also identify an analyte that is not enabled for Raman detection (i.e. not Raman active), wherein the analyte is attached to an analyte-binding molecule to form a complex that can be rendered identifiable using the present Raman assay, in turn identifying the presence or absence of the analyte of interest. The present Raman assay is operated using the present Raman device, wherein the portable device is described in more detail in example 2.

In addition, the present Raman assay can be used to quantify the amount of analyte present in a sample, and hence determine concentration of the analyte present.

Figure 1:
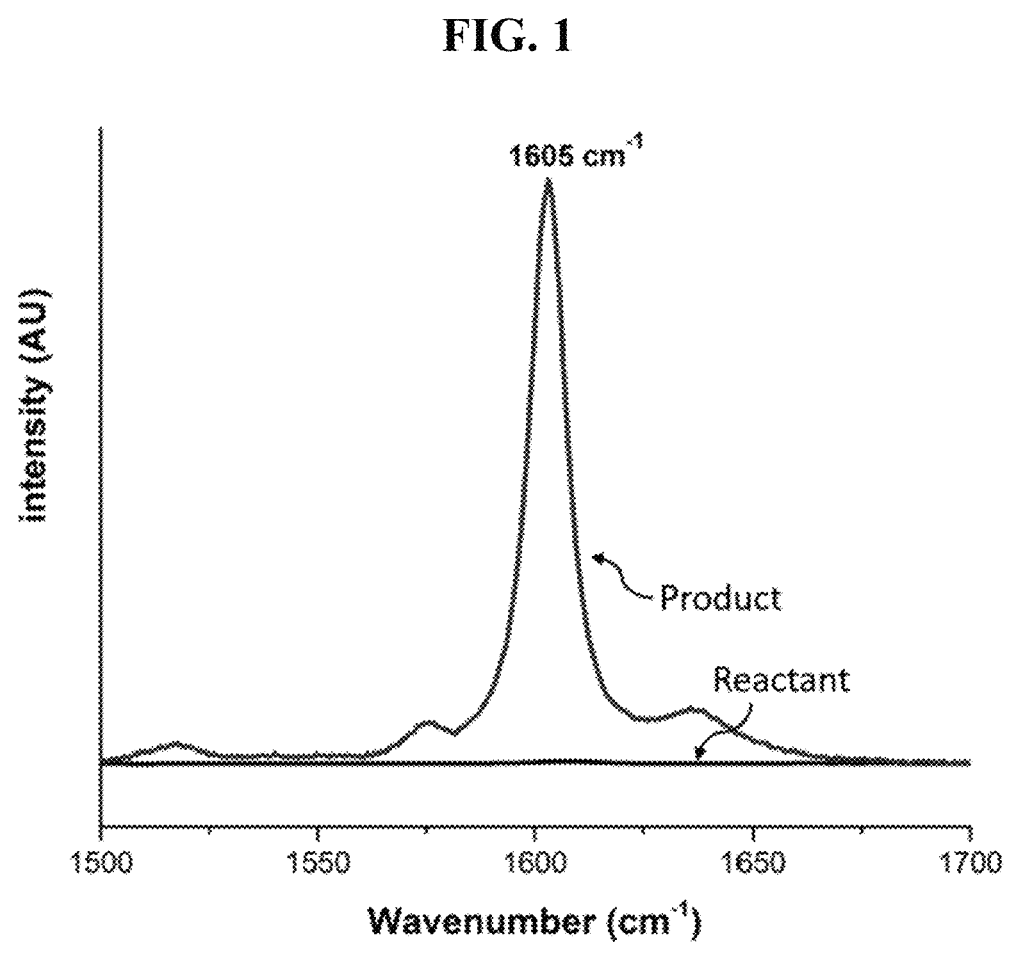

The present Raman assay may involve use of (i) an analyte or a complex formed from the analyte that possesses peroxidase activity, and/or (ii) a peroxidase substrate that can be rendered Raman active by reacting with the analyte or complex. Advantageously, only in the presence of the analyte or complex does the peroxidase substrate undergo oxidation to produce a peroxidase product that is Raman enabled (i.e. Raman active). The analyte of interest, complex and peroxidase substrate may all be Raman inactive, whereas the peroxidase product is Raman active to render a Raman signature unique to the peroxidase product, which can be a single peak that appears within a wavenumber ranging from 1500 to 1700 $cm^{-1}$. The resultant intensity of the peak provides details about the concentration of the analyte (see FIG. 1). The whole detection process can be completed within minutes.

The present Raman assay can be illustrated using haptoglobin as a non-limiting example of the analyte of interest. Haptoglobin may be Raman inactive. Advantageously, haptoglobin can be rendered identifiable with the present Raman assay. In this instance, haptoglobin can be reacted with an analyte-binding molecule, such as haemoglobin, to become a complex (i.e. haptoglobin-haemoglobin complex) wherein haptoglobin is attached to haemoglobin. The complex has peroxidase activity to catalyze the reaction of a peroxidase substrate with a peroxide source to render a peroxidase product that is Raman active. The peroxidase substrate and peroxide source can be, for example, 3,3',5,5'-tetramethyl-benzidine (TMB) and hydrogen peroxide ($H_2O_2$), respectively.

The complex catalyzes the reaction of 3,3',5,5'-tetramethylbenzidine (TMB) into a $TMB^{2+}$ in the presence of the hydrogen peroxide. The peroxidase product of $TMB^{2+}$ is strongly Raman active and hence provides an easily identifiable Raman signal.

Other than haptoglobin (Hp), other analytes of interest including but not limited to haemoglobin (Hb), myoglobin, myeloperoxidase (MPO), eosinophyl peroxidase (EPO), lactoperoxidase (LPO), thyroid peroxidase (TPO), and homologous members of the mammalian peroxidase family can be detected within minutes using the present Raman assay and device. Apart from these analytes that exhibit peroxidase activity, other analytes such as glucose oxide, 2',7'-dichlorofluorescein (DCF), etc., can also be detected by the present Raman assay and Device. Different anti-oxidants and reactive oxygen species (ROC) can also be detected with the present Raman assay and device.

Advantageously, proteins, antibody and other analytes that do not have the peroxidase or anti-oxidant activity can also be detected using the present Raman assay and device within 30 mins. This can be realized by tagging (i.e. attaching) horseradish peroxidase (HRP) enzyme on to either the protein or analyte of interest or onto their corresponding antibody.

In the non-limiting example as mentioned above, the detection of haptoglobin protein with peroxidase substrate TMB was carried out the Raman device of the present disclosure (see FIG. 8). The present Raman assay and device can also be used with other peroxidase substrates such as OPD (o-phenylenediamine dihydrochloride), ABTS (2,2'-azinobis[3-ethylbenzothiazoline-6-sulfonic acid]-diammonium salt), PNPP (p-nitrophenyl Phosphate, Disodium Salt) and guaiacol.

Describing the present Raman assay in more detail, 5 μl of a biofluid (i.e. sample) containing Hp was added to 5 μl of about 3.3 to 4 mg/ml of Hb and mixed well. The mixture was left to incubate for 5 minutes to form Hp-Hb complex. After 3 minutes to 5 minutes, 10 μl of TMB reagent was added to the mixture, mixed well and kept away from light source during the 2-minute reaction time. After 2 minutes, Raman measurement was performed immediately using the present Raman device. The Raman intensity of the prominent peak 1605 $cm^{-1}$ for each haptoglobin standards was baseline corrected and extracted using in-house software. The average RAMAN intensity was plotted based on several peaks against the different concentrations (in mg/ml) of standard haptoglobin and fitted into a linear plot. Peroxidase activity of any free haemoglobin is inhibited at low pH, preserving the peroxidase activity of bound haemoglobin. At low pH (less than 3), only the Hb-Hp complex preserves its peroxidase activity. Hence, the presence and quantity of Hp present in the sample can be identified therefrom. The peroxidase activity can be quantified by the intensity of the RAMAN signal of $TMB^{2+}$. The RAMAN intensity of the prominent peak 1605 $cm^{-1}$ is the peak that is of interest.

Various types of TMB (tetramethylbenzidine) were explored of which mainly TMB T8665, lyophilized TMB and 860336 TMB that were stored at 4° C. and room temperature (e.g. 25° C.). TMB T8665 is TMB in a liquid state. Lyophilized TMB means the liquid T8665 is vacuum dried to a powder form. 860336 TMB was already in powder form when purchased.

All the above TMB can be used for the peroxidase reaction. The TMB can be stored in its powder at room temperature, wherein storing at room temperature can help the stored TMB to last longer.

The peroxidase activity and concentration of the analyte-binding molecule is one factor that can be considered if a sample contains or suspected to contain a higher concentration of analyte, as detection of an analyte present in high concentration does not require an enhancing medium (e.g. SERS nanoparticle) to generate a stronger Raman signal. In other words, the present portable device is operable based on a pure Raman method, and not a SERS method, wherein the pure Raman method is sufficient to detect an analyte of interest. In fact, the present portable device is able to detect Raman signals even at concentration of 0.42 mg/ml or lower. The present Raman assay and device is operable for an intraoperative diagnosis setup, i.e. used during a surgery.

In summary, the analyte's presence in a biological sample can be determined by measuring the peroxidase activity of the biomarker complex. Advantageously, the present Raman assay and device are compatible for identifying an analyte of interest, whether the analyte is Raman active or not. The present Raman assay and device are operable even for an analyte that has to be Raman enabled, one example of which has been described, that is to attach to an analyte to an analyte-binding to render peroxidase activity for reacting with a peroxidase substrate in the presence of a peroxidase source.

Example 2: Present Raman Device

A simple and portable Raman measurement device is developed herein, which does not require (i.e. absent of) a spectrometer, rendering the present device economically affordable.

The present Raman device can be referred to as an optical device that enables Raman and/or SERS measurement without the need of a spectrometer. The present Raman device includes includes a Raman laser source 202, a detector 224 (e.g. a CMOS camera or a photodiode), one or more tunable filters 216, 218 and a controlling computer 200.

The present device is illustrated in FIG. 2. The laser beam from a laser source 202 (e.g. emitting laser of wavelength specifically of 785 nm) is delivered by a single mode or multi-mode fiber 204 (SMF or MMF) 204 to a collimating lens 206. The laser source 202 can be a monochromatic laser source. A filter 208 (e.g. band-pass filter) is used to clean any fluorescence signal from the delivery fiber 204. The dichroic mirror 212 reflects the laser from the collimating lens 206 into the objective lens 210 below. The laser hits the sample containing or suspected to contain the analyte of interest. The laser interacts with the sample (i.e. analyte of interest) and undergoes a change or shift in wavelength in the presence of the analyte of interest, producing or forming photons or a Raman signal. The photons or Raman signal has a wavelength longer than the wavelength of the laser from the laser source due to the shift or change in wavelength from interaction of laser from the laser source with the sample (i.e. analyte of interest). In other words, the photons or Raman signal correspond to the analyte of interest present in the sample. The photons may constitute or include the Raman signal. The photons or Raman signal is then reflected or transmitted back from sample to the dichroic mirror 212. Only those wavelengths longer than the wavelengths of laser from the laser source 202 can pass through the dichroic mirror 212. In this instance, wavelengths reflected from the sample that are longer than 785 nm can pass through the dichroic mirror 212. The reflected photons or Raman signal than passes on to another filter 214 (e.g. a notch filter) prior to one or more tunable filters 216, 218 and thereafter into a collimating lens 220 (e.g. a collection collimating lens). The one or more tunable filters 216, 218 are positioned prior to the collection collimator lens 220 to eliminate the light from the laser source. The one or more tunable filters 216, 218 can be a pair of tunable filters that confers band-pass selectivity. The detector 224 then receives the photons or Raman signal from the collimating lens 220 via a multi-mode fiber 222. The detector 224 can be a CMOS sensor in this instance that receives the Raman signal (i.e. the photons or Raman signal reflected back or transmitted from sample, or even SERS signal, through the MMF 222 after passing through the pair of tunable filters 216, 218. The pair of tunable filters 216, 218 transmit Raman signals at specific wavelengths depending on the angle at which the laser hits the filters 216, 218 (incident angle). By tuning (i.e. rotating) the filters 216, 218, the Raman spectral lines, and even SERS spectral lines, can be scanned and identified by the detector 224 (e.g. CMOS sensor).

The tunable filter angle affects which wavelength signals transmit through the tunable filters 216, 218, hence Raman signals, and even SERS signals, of a particular analyte of interest can be determined easily without background interference.

The tunable filters 216, 218 can be operably integrated to a high speed rotation means that helps to plot the complete Raman spectrum, and even SERS spectrum, over the entire wavelength range identified as well.

Example 3: Present Raman Device Using Tunable Filters and CMOS Camera as the Detector An example of the present Raman device based on tunable filters and CMOS camera (i.e. a CMOS sensor) is demonstrated herein.

The present Raman device is constructed in-house. Samples are deposited on glass slides. The sample herein contain haptoglobin as analyte of interest. A spectrometer is used for comparison. In this instance, the present Raman device is operated based on a Raman method, and not a SERS method, as the present Raman device is advantageously sensitive to detect even weak Raman signals from haptoglobin.

Protocol of the present Raman assay is first described.

Figure 5:
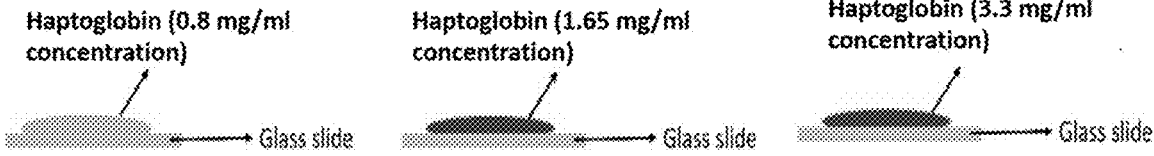
FIG. 5 depicts samples containing haptoglobin as the analyte of interest prepared at equal amounts but with different haptoglobin concentrations. The left, middle, and right images depict haptoglobin of 0.8 mg/ml, 1.65 mg/ml and 3.3 mg/ml concentration, respectively, on a glass slide.

A haptoglobin sample of three different concentrations is prepared. Equal amount of samples with different concentrations were dropped on to the glass slide. FIG. 5 left image shows the haptoglobin sample with 0.83 mg/ml concentration, FIG. 5 center image shows, the haptoglobin sample with 1.65 mg/ml concentration, and FIG. 5 right image shows the haptoglobin sample with 3.3 mg/ml concentration. The present Raman device and a spectrometer-based system are used to detect and identify the Raman signal from the haptoglobin samples.

Figure 6:
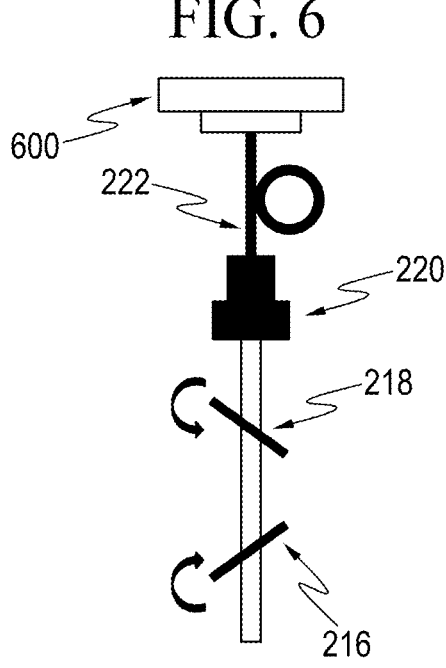
FIG. 6 shows a conventional spectrometer 600 presently adapted or retrofitted with different tunable band-pass filters 216, 218, wherein the tunable filters 216, 218 are of the present disclosure used to identify and determine Raman signal. The tunable filters 216, 218 of FIG. 2A are used in this instance.
Figure 7:
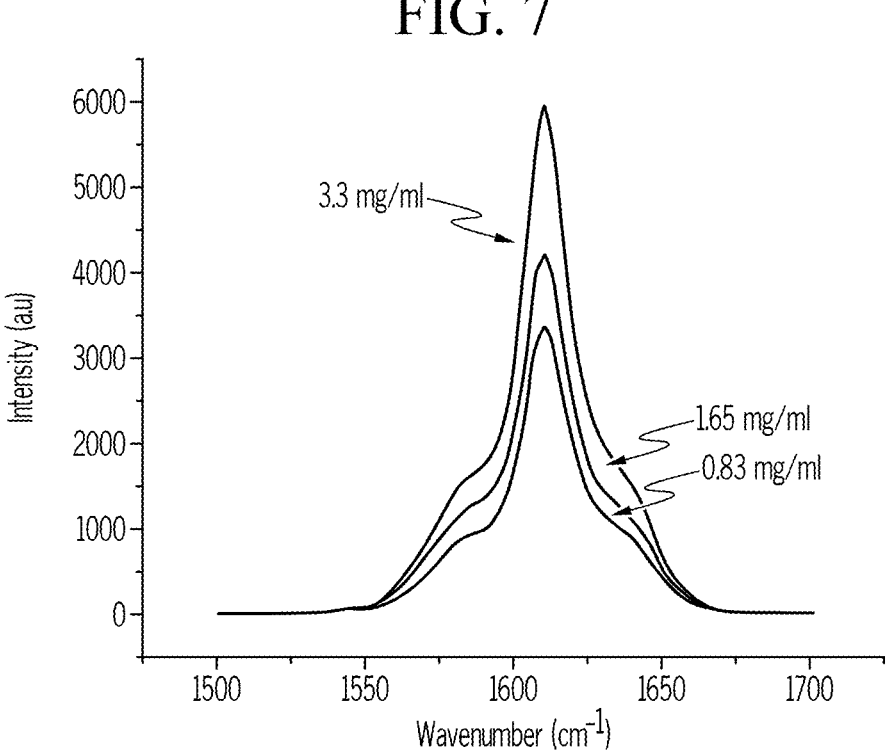
FIG. 7 shows the Raman spectra (i.e. Raman signals) from haptoglobin sample identified using the spectrometer 600 of FIG. 6.

The optical focus is fixed on the glass slide and the tunable filters are rotated. The Raman signal from the glass slide is recorded using a spectrometer 600 at different tunable band-pass through the tunable filters 216, 218 (see FIG. 6). Results are plotted in FIG. 7.

The samples were also subject to measurement using the present Raman Device and the results are plotted in FIG. 8. FIG. 8 shows the result of Raman signal from the haptoglobin samples over time. Raman signals from the three samples with different concentration are clearly and distinctly identifiable.

To understand the accuracy of the present Raman device, the laser beam is focused to the glass slide and Raman signals are measured using a spectrometer while tuning the filters. From FIG. 9, it can be seen that the Raman signals are shifted with different tuning angle and reaches the maximum at 1400 nm, which then gradually decrease after. The spectra match with the actual glass Raman spectra. Said differently, FIG. 9 shows the ability of rotatable filters to select the wavenumber of choice by changing the angle of incidence on each rotatable filter, i.e. rotating a pair of rotatable filters renders changes in the angles of incidence and hence changes the wavenumber region for detecting a Raman peak. FIG. 9 shows the signals detected from the glass slide where the glass Raman signals are significantly prominent about 1400 $cm^{-1}$. The prominent intensity may decrease with increasing wavenumber. The results are similar to Raman spectra from glass at different wavenumbers.

From the results and examples described above, the present Raman device, e.g. confocal Raman device based on tuneable filters and CMOS detector built in-house demonstrated desirable sensitivity. The result of the present device matches with traditional spectrometer-based methods.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A portable device which detects a Raman signal from an analyte of interest contained in or suspected to contain in a sample, the portable device comprising:
   a laser source in optical communication with a dichroic mirror;
   an objective lens optically positioned to consolidate the laser beam from the laser source to the sample;
   (i) a pair of rotatable filters in optical communication with the dichroic mirror and an optical transmission module, or (ii) a first band-pass filter in optical communication with the dichroic mirror and an optical transmission module, wherein the first band-pass filter is tunable;
   a rotational member operably connected to the pair of rotatable filters or the first band-pass filter; and
   a detector optically positioned to receive and detect a Raman signal produced from the laser beam incident on the analyte of interest,
   wherein the dichroic mirror directs the laser beam from the laser source to the sample through the objective lens and transmits any Raman signal from the sample toward the detector,
   wherein the dichroic mirror is optically pervious to any Raman signal having a wavelength longer than the wavelength of the laser beam from the laser source, and
   wherein the detector is absent of a spectrometer and remains operable to detect the Raman signal.

2. The portable device of claim 1, wherein the detector comprises a CCD sensor, a CMOS sensor, a photodiode, or a photomultiplier tube.

3. The portable device of claim 1, wherein the detector comprises a CMOS camera.

4. The portable device of claim 1, wherein the laser source is a monochromatic laser source.

5. The portable device of claim 1, wherein the laser beam from the laser source has a wavelength ranging from 400 nm to 800 nm.

6. The portable device of claim 1, wherein a first collimating lens is optically positioned between the laser source and the dichroic mirror.

7. The portable device of claim 6, wherein the first collimating lens comprises a pair of collimating lens.

8. The portable device of claim 1, further comprising a first fiber in optical communication with the laser source and the dichroic mirror, wherein the first fiber comprises a single mode fiber or a multi-mode fiber, which directs the laser beam from the laser source to the dichroic mirror.

9. The portable device of claim 8, wherein a second band-pass filter is optically positioned after the first fiber and before the dichroic mirror to eliminate fluorescence generated from laser beam transmitting through the first fiber.

10. The portable device of claim 1, wherein a notch filter is optically positioned between (i) the dichroic mirror and the pair of rotatable filters or (ii) the dichroic mirror and the first band-pass filter, to eliminate the laser beam from the laser source from reaching the detector through the pair of rotatable filters or the first band-pass filter.

11. The portable device of claim 1, wherein each rotatable filter in the pair of rotatable filters is rotatable to have an angle defined by photons reflected from the sample incident on each of the rotatable filters and a surface of each of the rotatable filters which the photons reflected from the sample is incident on, wherein the angle renders each rotatable filter optically pervious to a range of wavelengths of the photons transmitted from the dichroic mirror to be detected by the detector so as to have the detector identify the Raman signal corresponding to the analyte of interest from the range of wavelengths of photons.

12. The portable device of claim 11, wherein each rotatable filter in the pair of rotatable filters are operably attached to one or more rotational members which control the angle and/or direction of rotation of each rotatable filter in the pair of rotatable filters.

13. The portable device of claim 1, wherein a second collimating lens is in optical communication with (i) the optical transmission module and the pair of rotatable filters or (ii) the optical transmission module and the first band-pass filter.

14. The portable device of claim 1, wherein the optical transmission module comprises a second fiber or a pinhole occluder to direct any Raman signal to the detector from the pair of rotatable filters or from the first band-pass filter.

15. The portable device of claim 14, wherein the second fiber comprises a multi-mode fiber.

16. The portable device of claim 1, further comprising a computer operably connected to the detector and/or (i) the pair of rotatable filters or (ii) the first band-pass filter, to generate a Raman spectrum which indicates the presence or absence of the analyte of interest.

* * * * *